United States Patent [19]

Yano

[11] 4,337,467

[45] Jun. 29, 1982

[54] LIQUID JET RECORDING PROCESS

[75] Inventor: Yasuhiro Yano, Tokyo, Japan

[73] Assignee: Canon Kabushiki Kaisha, Tokyo, Japan

[21] Appl. No.: 133,142

[22] Filed: Mar. 24, 1980

[30] Foreign Application Priority Data

Aug. 10, 1979 [JP] Japan .................. 54-102487

[51] Int. Cl.³ ............................................. G01D 15/18
[52] U.S. Cl. ................................. 346/1.1; 346/140 R
[58] Field of Search .............................. 346/140, 75, 1

[56] References Cited

U.S. PATENT DOCUMENTS 4,243,994 1/1981 Kobayashi ...................... 346/140 R
4,251,824 2/1981 Hara ............................... 346/140 R

OTHER PUBLICATIONS

Japanese Laid Open Patent No. Sho 54-51837, referred to at page 2, lines 17-22.

Primary Examiner—Joseph W. Hartary
Attorney, Agent, or Firm—Fitzpatrick, Cella, Harper & Scinto

[57] ABSTRACT

A liquid jet recording process utilizing a recording head comprising, a liquid ejecting portion including an orifice for ejecting a liquid droplet, a heat actuating portion having a heating surface adapted to apply heat energy to the liquid, and an electrothermal transducer for generating heat energy comprises applying heat energy to for a bubble capable of extending over substantially the entire area of said heating surface and thereby ejecting a liquid droplet from said orifice.

1 Claim, 6 Drawing Figures

LIQUID JET RECORDING PROCESS

BACKGROUND OF THE INVENTION

1. Field of the Invention

The present invention relates to a liquid jet recording process where a liquid is ejected to form flying liquid droplets for recording.

2. Description of the Prior Art

Non-impact recording processes have recently drawn attention since the noise accompanying recording operation is negligibly small.

Among them, the ink jet recording process (liquid jet recording processes) which can effect high speed recording and can record on plain paper without fixation are very powerful processes. Heretofore, a wide variety of the systems and apparatuses therefor have been proposed. Some of them have been practically operated while others are now under development.

The liquid jet recording process disclosed in Japanese Patent Laid Open No. Sho 54-51837, Deutsch Offenlegungsschrift Nr. 2843064, U.S. Application No. 948236, filed Oct. 3, 1978, has a feature different from other liquid jet recording methods. The feature is that heat energy is applied to a liquid to produce an actuating force for ejecting the liquid.

The above-mentioned patent applications disclose a recording process in which a liquid causes a change of the state accompanying an abrupt increase in volume by application of heat energy and the actuating force due to the change of the state functions to eject liquid droplets from the orifice at the tip of a recording head and project the droplets to a record receiving member.

The liquid jet recording process of Deutsch Offenlegungsschrift Nr. 2843064 is effectively applied to the so-called drop-on-demand type recording process and moreover, the recording head can be easily constructed in the form of a high density multiorifice system of a full line type. As the result, images of high resolution and high quality can be produced at a high speed.

In this way, the above-mentioned liquid jet recording process has excellent features, but it is necessary for a higher speed recording of such images of high resolution and high quality that the number of the liquid droplets ejected from one orifice per unit time ($N_o$) is increased.

In short, according to the above mentioned liquid jet recording process, bubbles are generated by a heat action and the abrupt increase and decrease of the volume causes the corresponding abrupt change of state and thereby, liquid droplets are projected from the orifice of the recording head to effect recording. It is necessary to increase $N_o$ by shortening the time for repeating the increase and decrease in volume (improvement in the liquid droplet ejection repeating property). It is proposed to increase the decaying speed of the increased bubble volume which is a rate controlling stage, for the purpose of improving said liquid droplet ejection repeating property. That is, the decaying curve of the bubble volume is made steep by a forced cooling to increase $N_o$. The bubble is generated by heat from an electrothermal transducer transferred to a liquid in a heat actuating portion. For example, this may be carried out by following the procedures of Japanese Patent Laid Open No. Sho 54-51837 in which the heat actuating portion of a transducer and the liquid are forcibly cooled by a cooling means such as a Peltier element and the like.

However, when such a special cooling means is arranged at the recording head, the recording apparatus becomes complicated and expensive, and, in particular, such disadvantages are remarkable in case of a recording head of a multi-orifice type. Furthermore, in case of a recording head of a high density multi-orifice type, the result is far poorer since a high grade of precision technique is required for manufacturing such recording head from the view points of structure, processing and fabrication and therefore this results in a low yield, high cost and difficult maintenance.

Further, when the above mentioned cooling means is used to effect a forced cooling so as to accelerate reduction of volume of the generated gas, the cooling efficiency is low because the cooling of the bubble is carried out indirectly by cooling the liquid surrounding the bubble. The response of the cooling means is so slow that improvement in the repeating liquid droplet ejecting property is limited. If it is contemplated to increase the cooling velocity, it is necessary to excessively cool the liquid surrounding the bubble. This results in lowering of liquid droplet ejecting property and other disadvantages.

These disadvantages cause unstable supply of the liquid to the heat actuating portion in the recording head, non-uniform volume of ejected liquid droplets, non-uniform speed for ejecting liquid droplets, lowering of fidelity and accuracy of response to recording signals and like, lowering of recorded image quality, and stoppage or recording.

SUMMARY OF THE INVENTION

It is an object of the present invention to provide a liquid jet recording process free from the drawbacks as mentioned above.

It is another object of the present invention to provide a liquid jet recording process of improved liquid droplet ejecting property, capable of giving a uniform volume of ejected liquid and of more improved stability of liquid droplet ejection.

It is a further object of the present invention to provide a liquid jet recording process capable of producing recorded images of high resolution and high quality stably and at high speed for a long time and continuous recording.

According to the present invention, there is provided a liquid jet recording process utilizing a recording head comprising, a liquid ejecting portion including an orifice for ejecting a liquid droplet, a heat actuating portion having a heating surface adapted to apply heat energy to the liquid, and an electrothermal transducer for generating heat energy which comprises: applying heat energy to form a bubble capable of extending over substantially the entire area of said heating surface and thereby ejecting a liquid droplet from said orifice.

According to another aspect of the present invention, there is provided a liquid jet recording process which comprises: filling with a liquid a heat actuating portion in communication with an orifice for ejecting a liquid droplet to propel, the heat actuating portion being provided with a heating surface which contacts the liquid to apply heat energy generated by an electrothermal transducer, applying to the electrothermal transducer an electric signal of a level capable of effecting a rapid rise of the temperature of the heating surface through the temperature range at which a spherical bubble is formed, thereby forming a bubble on the heating surface and growing the bubble until it becomes a semipillow type bubble extending over substantially the entire area of the heating surface, ejecting the liquid from the orifice to propel a liquid droplet toward a recording member, and supplying make-up liquid to the heat actuating portion after the ejection of the liquid droplet.

DESCRIPTION OF THE PREFERRED EMMBODIMENTS

The present inventors have found that there are formed substantially two types of bubbles at the heat actuating surface and one type of bubble effectively functions to eject liquid droplets and the other type of bubble adversely affects liquid droplet ejecting properties, in particular, liquid droplet ejecting frequency $f_D$, uniformity of the ejected volume of liquid droplets and stability of liquid droplet ejection. According to the present invention, the former bubble is positively produced to eliminate the above mentioned drawbacks without any forced cooling.

The former bubble capable of effectively ejecting liquid droplets exhibits a far higher growing speed and shrinking speed than the latter bubble, and moreover the former bubble is of good response to electric signals S applied to the electrothermal transducer with respect to formation, growing and shrinking.

In other words, the present inventors have found that when bubbles are produced from the liquid at an actuating portion by thermal energy generated corresponding to input electric signals applied to an electrothermal transducer provided in a recording head, there are formed two kinds of bubbles as mentioned above, that is, one is a semi-pillow type bubble which effectively functions to eject liquid droplets and the other is a spherical bubble whose formation and growing are positively suppressed in the present invention.

The spherical bubble grows very slowly and once it forms, its volume is not reduced so easily when switching off the current to the electrothermal transducer to stop the formation of heat energy, and therefore, formation of bubble for the next ejection of liquid droplet is distrubed. Thus, a cooling means for positively reducing and eliminating the bubble volume is required.

Further, when such cooling means is provided, a large scale of cooling means is necessary for increasing $f_D$.

The spherical bubble is often isolated from the heating surface to move in the liquid conduit and stay at an undesirable portion resulting in distrubing ejection of liquid droplets. In addition, ejection of liquid droplet does not follow on-off of electric signals S with fidelity and is not carried out synchronizingly with frequency of electric signals S.

The present invention has been achieved based on the above mentioned discoveries.

Figure 1A:
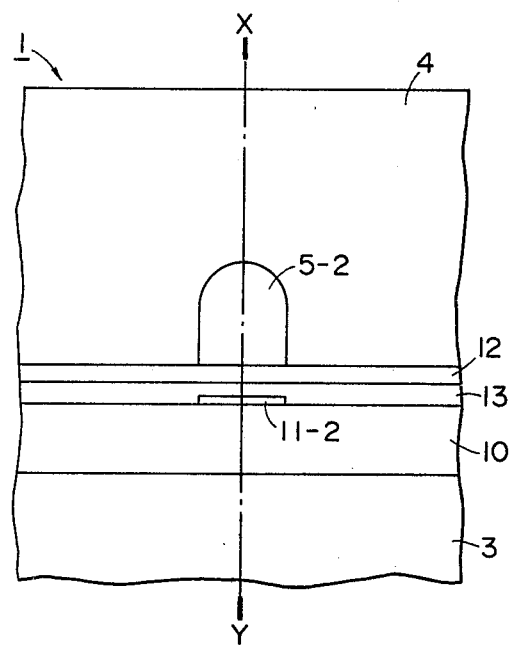
FIG. 1A is a partial front view from the orifice side of an embodiment of a liquid jet recording head which can be used in the process of the present invention.
Figure 1B:
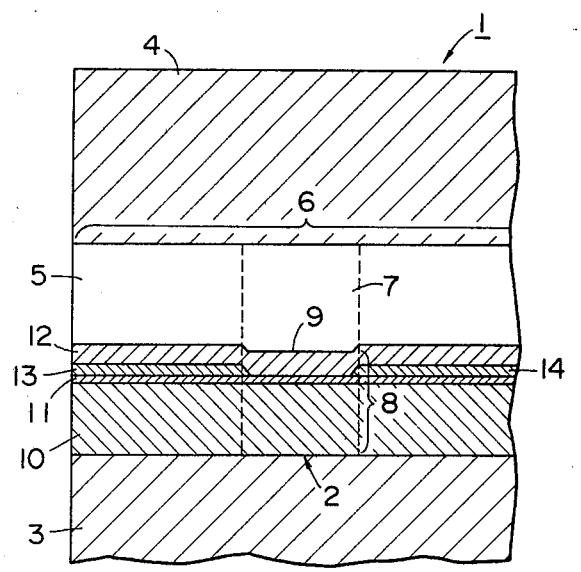
FIG. 1B is a cross sectional view taken along the dot and dash line X-Y of FIG. 1A.

FIG. 1A is a part of the front view from the orifice side of a liquid jet recording head to which the process of the present invention may be applied, and FIG. 1B is a cross sectional view taken along the line X-Y of FIG. 1A.

A recording head 1 is constructed as follows. The surface of a substrate 3 is provided with an electrothermal transducer 2. A grooved plate 4 having a groove of a predetermined width and depth is mounted on the surface of substrate 3 to form an orifice 5 and a liquid ejecting portion 6. The recording head in the drawing is provided with only one orifice 5. The present invention is not restricted to the illustrated embodiment, but can be applied to a recording head of so-called multi-orifice type having a plurality of orifices.

Liquid ejecting portion 6 includes orifice 5 at the end portion for ejecting the liquid droplets and a heat actuating portion 7 where heat energy generated by electrothermal transducer 2 acts on the liquid to form a bubble and an abrupt state change is caused by expansion and shrinking of the liquid volume.

Heat actuating portion 7 is located on the heat generating portion 8 of electrothermal transducer 2, and the bottom of heating actuating portion 7 is a heating surface of the heat generation portion 8 and contacting the liquid.

Heat generating portion 8 includes a lower layer 10 mounted on substrate 3 and, a resistive heater layer 11 overlying the lower layer 10. On the layer 11 are arranged electrodes 13 and 14 for conducting electric current to the layer 11. Electrode 14 is arranged along the flow path of the liquid ejecting portion.

An upper layer 12 serves to protect chemically and physically the resistive heater layer 11 from the liquid by separating the resistive heater layer 11 from the liquid, and further the upper layer 12 prevents electrodes 13 and 14 from shortcircuiting through the liquid.

Upper layer 12 can function as mentioned above, but where resistive heater layer 11 is resistant to the liquid and there is no fear of shortcircuit between electrodes 13 and 14 through the liquid, it is not always necessary to provide such layer 12 and the electrothermal transducer may be constructed in such a way that the liquid directly contacts the surface of resistive heater layer 11.

The lower layer 10 has mainly a function of controlling the heat flow, that is, when liquid droplets are ejected, the heat generated at the resistive heater layer 11 and transferred to the substrate 3 is in an amount smaller than that transferred to the heat actuating portion 7 as far as possible while, after ejecting liquid drops, i.e. after switching off electric current to the resistive heater layer 11, the heat accumulated is the heat actuating portion 7 and the heat generating portion 8 is rapidly transferred to the substrate 3 to reduce the volume of the bubble generated at the heat actuating portion 7.

As mentioned above, in a recording head ejecting liquid droplets where bubbles are formed in the liquid by heat and liquid droplets are ejected by rapid expansion and reduction of volume of the bubbles, there are formed two kinds of bubbles such as a semi-pillow type bubble and a spherical bubble upon driving an electrothermal transducer arranged in the recording head to form bubbles.

According to the present invention, the electrothermal transducer in the recording head is driven such that the semi-pillow type bubble is formed positively. Thus, there can be realized highly efficient utilization of liquid droplet ejecting energy, high thermal response, improvement in continuous repeating of liquid droplet ejection, improvement in liquid droplet ejection frequency $f_D$, uniform amount of liquid droplet ejection, stabilization of ejection direction of liquid droplet, uniform speed of liquid droplet ejection, and improvement in fidelity and certainty of response to recording signals, and thereby images of high resolution and high quality can be recorded at a high speed.

Figure 2A:
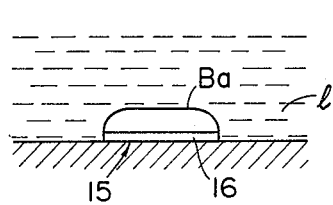
FIGS. 2A and 2B show diagrammatical cross sectional views for explaining formation and shape of the bubbles.
Figure 2B:
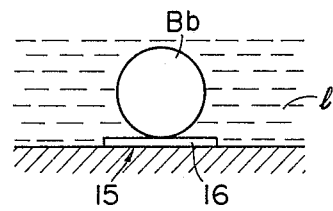
Figure 2C:
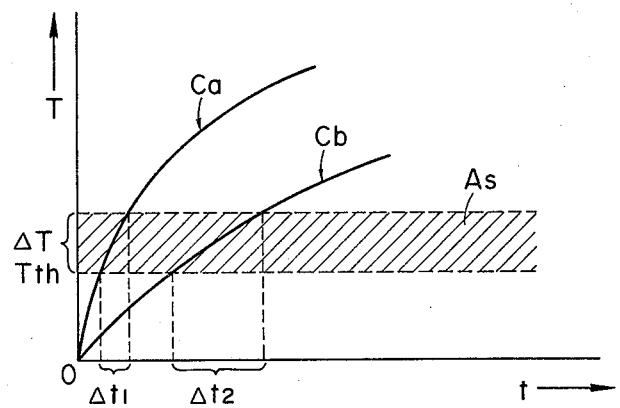
FIG. 2C is a graph showing a relation between a temperature T at the heating surface and a time.

In FIGS. 2A and 2B, representative shapes of the above mentioned two types of bubbles are diagrammatically shown, and in FIG. 2C, there is given a graph showing the relation between the temperature of a heating surface and the lapse of time when an electric signal S is applied to an electrothermal transducer.

FIG. 2A is a side view of a semi-pillow type bubble Ba which is positively formed in the present invention upon ejecting liquid droplets. The semi-pillow type bubble Ba is formed covering substantially the whole area of heating surface 16 of electrothermal transducer 15 which contacts a liquid "l" and applies the generated heat energy to a liquid "l", upon formation and growing of the bubble Ba.

On the contrary, in FIG. 2B is a side view of a spherical bubble Bb whose formation and growing are suppressed as far as possible or whose formation is prevented. The spherical bubble is formed, upon formation and growing, such that the spherical bubble tangentially contacts a heating surface 16 of an electrothermal transducer 15.

These two types of bubbles behave differently from each other as shown below. For the purpose of improving liquid droplet ejecting characteristics, it is necessary to apply to an electrothermal transducer 15 an electric signal S capable of positively forming the semi-pillow type bubble Ba.

The semi-pillow type bubble Ba grows at a speed as high as on the order of $\mu$sec., and when the level of electric signal S is determined, the bubble Ba is repeatedly generated, grows and disappears exactly in response to on-off of the electric signal S to the electrothermal transducer with a constant volume of the grown-up bubble. Therefore, the volume of ejected liquid droplet and the speed of ejecting liquid droplet are uniform. Liquid droplets are ejected in conformity with an applied frequency of electric signal S, and further the direction of ejecting liquid droplets is stable. There are further various advantages.

On the contrary, the spherical bubble Bb is formed on the heating surface 16 in such a way that the bubble Bb tangentially contacts the heating surface 16. When an electric signal S is repeatedly applied to an electrothermal transducer at a constant cycle, the spherical bubble Bb does not follow the applied frequency of the electric signal S at all and gradually increases in its volume and finally isolates itself from the heating surface 16 to move somewhere in the liquid conduit or be exhausted to outside.

Further when the application of the signal S to the electrothermal transducer 15 is switched off to stop the heat generation at the heating surface 16, the spherical bubble Bb does not immediately respond to the stoppage of heat generation, but the volume still increases continuously and then sometimes the volume is very slowly shrunk, but in most cases the volume is hardly shrunk regardless of decrease in temperature of the heating surface 16, and when the temperature of the heating surface 16 becomes lower than a particular temperature, the bubble Bb is isolated from the heating surface 16 and moves to somewhere else, or stays at the upper part of the heat actuating portion resulting in disturbing the next bubble generation, lowering the efficiency of supplying the liquid to the heat actuating portion and, when things are at the worst, no ejection of liquid droplets.

The spherical bubble Bb is not synchronized with the applied frequency of the electric signal S to the electrothermal transducer 15 with respect to repeating its generation and disappearing and the volume continues to increase during repeated application of the electric signal S. When the bubble Bb grows up to a particular volume or more, it is isolated from the heating surface 16 and then a process that a new bubble of the same property as the previous one is generated, grows and is isolated is repeated very slowly at an indefinite interval with respect to the above mentioned applied frequency.

As the result, the generation of the spherical bubble Bb remarkably lowers the liquid droplet ejecting properties and gives undesirable results.

This will be explained in detail below by using a graph of FIG. 2C. Time (t) is in the absissa and the temperature (T) of a heating surface 16 of an electrothermal transducer 15 is in the ordinate.

The curves show the relation between the temperature (T) of the heat actuating surface 16 and the lapse of time (t) in the case of applying an electric signal to an electrothermal transducer 15.

The application of an electric signal S to an electrothermal transducer 15 results in generation of heat at a heat generating portion of the transducer 15 and thereby the temperature (T) of the heating surface 16 is raised. The rising rate of the temperature (T) and the shape of the temperature (T) rising curve vary depending upon the level of signal S applied, a time during which the signal S is applied, materials and structure of the electrothermal transducer 15, and the type of the liquid, and are determined by the combination of these multiple elements.

As the temperature (T) of the heating surface 16 rises, the temperature (T) reaches the minimum temperature (Tth) at which a spherical bubble (Bb) is generated and grows in the region (As) at or above the minimum temperature (Tth) as indicated by hatching.

When the temperature (T) of the heating surface 16 exceeds the region (As), formation and growing of a semi-pillow type bubble (Ba) are observed which is positively utilized in the ejection of liquid droplets in the present invention.

In this way, the bubble Ba is generated at a relatively high temperature region while the bubble Bb is generated at a relatively low temperature region. The minimum temperature (Tth) and the temperature range ($\Delta T$) of the region (As) where a spherical bubble Bb is generated and grows depend on physical properties of the liquid such as boiling point bp, surface tension $\gamma$, visicosity $\eta$ and the like and surface characteristics of the heating surface 16.

However, when the electrothermal transducer and the liquid are determined, the As and $\Delta T$ are also determined primarily.

The shape of bubble Ba is conveniently expressed as "semi-pillow type", but can be any of various shapes depending upon the surface shape of the heating surface 16. Anyway, whatever shape the bubble Ba may be, it is decisively different from that of the bubble Bb in that the bubble Ba can cover substantially the whole area of heating surface 16 and it forms and grows in a moment to a predetermined volume while the bubble Bb is of a spherical form contacting the heating surface 16 at only one point and grows gradually.

According to the present invention, the electrothermal transducer is driven in such a manner that the bubble Ba is positively formed and utilized upon ejecting liquid droplets while the formation of bubble Bb is suppressed as far as possible and its growth is positively suppressed to an extent that the purpose of the present invention can be achieved. In other words, as shown in FIG. 2C, the level of signal S applied to an electrothermal transducer 15 is selected such that the temperature (T) of the heating surface 16 rises following the curve Ca.

In case of curve Ca, the time ($\Delta t_1$) necessary for passing through the temperature region As where a spherical bubble Bb forms and grows is very short, that is, $dT/dt$ (temperature rise per unit time in region As) is so large that the temperature (T) of the heating surface reaches a temperature above the region As before a spherical bubble Bb sufficiently grows even if it forms. And in the temperature region above the region As a bubble Ba capable of effectively ejecting liquid droplets forms and grows so that formation and growing of the bubble Bb do not occur any more.

As is clear from above, it is possible to suppress formation and growing of a bubble Bb and positively generate and utilize a bubble Ba capable of effectively ejecting liquid droplets by making the rising curve of the temperature of a heating surface 16 steep in the region As by means of on-off application of signal S to the electrothermal transducer 15, that is, increasing $dT/dt$ to at least a value at which growing of a bubble Bb becomes negligibly small (i.e. making $\Delta t_1$ shorter).

On the contrary, in case of curve Cb, the $dT/dt$ in the region of As is smaller than that of curve Ca, that is, $\Delta t_2$ is so large that a spherical bubble Bb is generated and sufficiently grows up to a volume which disturbs ejection of liquid droplets. As the result, the previously mentioned disadvantages are caused.

In the present invention, the value of $dT/dt$ in the region As varies depending upon physical characteristics of the liquid used and can not be absolute value, but when a liquid is specified, the value of $dT/dt$ required in the present invention for each particular recording head can be easily found by the following procedures. In practice, the determination of value of $dT/dt$ is made by determining the level of an electric signal S applied to an electrothermal transducer, practically, determining the value of voltage. Such value of voltage can be determined by using a manufactured recording head, varying the voltage value of a signal S applied and observing the bubble thus formed in accordance with the following method.

Figure 3:
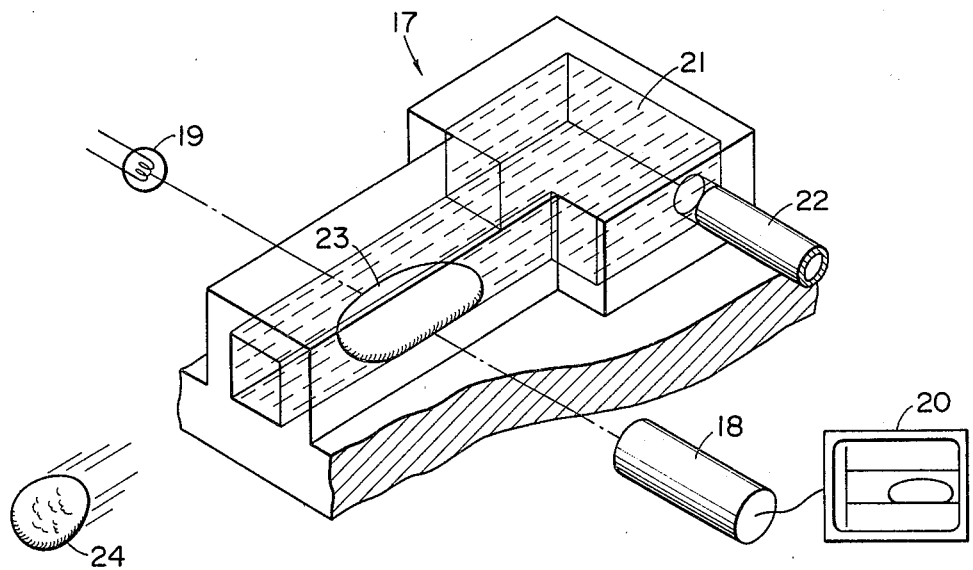
FIG. 3 is a diagrammatical oblique view for explaining an apparatus for observing a bubble shape in connection with the present invention.

(1) producing a recording head 17 as shown in FIG. 3 which is made of glass so that the heat actuating portion can be seen through it.

(2) A monitor TV 18 is placed at one side of the recording head 17 and a light source 19 such as LED, stroboscope and the like, is arranged at the other side, and they are on an axis passing the bottom surface of the heat actuating portion.

(3) The value of pulse voltage applied to the electrothermal transducer (pulse width:t (sec.)) is gradually raised.

(4) In parallel with the voltage application procedure as in item (3) above, light source 19 is synchronized with the voltage pulse to emit light, and formation of a bubble is observed by monitor TV 18.

(5) As the result of observation in item (4) above, the measured voltage value at which a spherical bubble is generated is designated as $V_1$ and that where a semi-pillow type bubble is generated is designated as $V_2$.

In the above method, a solution composed of liquid components excluding dyes is used as an ink in order to facilitate the observation of a bubble.

In FIG. 3, ink is fed from the outside through an ink feeding pipe 22 to an ink feeding chamber 21 for supplying ink to an actuating portion of the recording head. Liquid droplets 24 are ejected by the formation of bubble 23.

As mentioned above in detail, according to the present invention, there can be achieved a remarkable improvement in liquid droplet ejecting frequency $f_D$ and stable liquid droplet ejection, uniform liquid droplet ejecting amount, stabilization of direction of liquid droplet ejection, uniform ejecting speed of liquid droplets and improvement in fidelity of response to electric signals S, and further it can be easily effected to record the images of high resolution and high quality at a high speed.

Heat energy generated at the heat actuating portion by input electric signal S acts on the liquid at the heat actuating portion at a high efficiency and the resulting force for ejecting liquid droplets is effectively consumed to eject liquid droplets so that the energy for ejecting liquid droplets can be easily saved.

The following examples are given for illustrating the present invention and not by way of limitation.

EXAMPLE 1

On a $Al_2O_3$ substrate was formed an $SiO_2$ layer (a lower layer) in the thickness of 3 microns by sputtering, then a Ta layer in the thickness of 100–300 Å as a resistive heater layer and further a layer of aluminum in the thickness of 3000 Å as an electrode, and further a resistive heater pattern of 40 microns×200 microns was produced by selective etching.

Then an $SiO_2$ layer was formed in the thickness of 0.5 microns on the surface of the resistive heater pattern as a protective layer (an upper layer) by sputtering to produce an electrothermal transducer. A glass plate having a groove of 40 microns wide and 40 microns deep was attached to the electrothermal transducer such that the groove meets the resistive heater. The orifice and surface was ground to make the distance between the tip of the resistive heater and the orifice 70 microns. Thus a recording head was obtained.

While feeding an ink composed of a black dye and ethanol, that is, 5% by weight of Nigrosine dye and 95% by weight of ethanol, to the heat actuating portion, voltage pulse letter signals were continuously applied to the electrothermal transducer under various conditions and there were observed good ejection of liquid droplets corresponding to the letter signals and poor ejection thereof.

Ejection stability and maximum response frequency under various conditions were measured, and the results are shown in Table 1.

In addition, the shape of each of bubbles produced by the above mentioned conditions for ejecting liquid droplets was observed by the bubble shape observing apparatus in FIG. 3, and the results are also shown in Table 1 below.

TABLE 1

| Sample No. | Thickness of Ta film (Å) | Voltage (V) | Pulse width (μsec) | Shape of bubble | Ejection stability | Response frequency limit (KHz) |
| --- | --- | --- | --- | --- | --- | --- |
| 1 | 100 | 20 | 10 | Semi-pillow | Stable | 10 |
| 2 | 200 | 15 | 10 | Semi-pillow | Stable | 8 |
| 3 | 200 | 10 | 10 | Spherical | Unstable | No response frequency |
| 4 | 300 | 5 | 10 | " | " | No response frequency |
| 5 | 300 | 5 | 20 | " | " | No response frequency |
| 6 | 300 | 5 | 50 | " | " | No response frequency |

EXAMPLE 2

By using the recording head of Sample No. 1 prepared in Example 1 and an ink composed of a black dye and water, that is, 3% by weight of Direct Black 51 (C.I. 27720) ("Japanol Fast Black Conc.", trade name, supplied by Sumitomo Chemical Industry) and 97% by weight of water, ejection of liquid droplets and shape of bubble were observed under the conditions of Table 2 below. Table 2 shows that excellent ejection characteristics are obtained when ejection is effected by forming a bubble having a shape as defined in the present invention.

TABLE 2

| Voltage (V) | Pulse width (μsec) | Shape of bubble | Ejection stability | Response frequency limit (KHz) |
| --- | --- | --- | --- | --- |
| 33 | 10 | Semi-pillow | Stable | 12 |
| 21 | 10 | Spherical | Unstable | No response frequency |
| 12 | 100 | " | " | No response frequency |

What I claim is:

1. A liquid jet recording process utilizing a recording head comprising a liquid ejecting portion including an orifice for ejecting a liquid droplet at the end, a heat actuating portion forming a part of the liquid path and communicating with the orifice, a heating surface constituting at least one portion of the inner wall of the heat actuating portion, and an electrothermal transducer comprising a resistive heater and electrodes applying an electric signal to the resistive heater layer to generate heat at said layer and the generated heat being transferred to the heating surface, which comprises:

filling the liquid path of the liquid ejecting portion with the liquid, raising the temperature of the heating surface to a temperature higher than the temperature range at which a spherical bubble is formed by applying to the electrothermal transducer an electric signal of a level capable of making the temperature-rise per unit time of the temperature of the heating surface rapid at a region where the temperature rise curve crosses the temperature region at which a spherical bubble is formed so as to substantially suppress the formation and growing of the spherical bubble, thereby forming a semi-pillow type bubble extending over substantially the entire area of the heating surface, ejecting the liquid from the orifice by the force generated due to the formation of the bubble to propel a liquid droplet toward a recording member, and supplying make-up liquid to the heat actuating portion after the ejection of the liquid droplet.

* * * * *